United States Patent
Eom et al.

(10) Patent No.: US 8,824,182 B2
(45) Date of Patent: Sep. 2, 2014

(54) SWITCH CONTROLLER AND CONVERTER INCLUDING THE SAME

(75) Inventors: Hyun-Chul Eom, Seoul (KR); Jin-Tae Kim, Seoul (KR); Gyoung-Soo Park, Seoul (KR)

(73) Assignee: Fairchild Korea Semiconductor Ltd., Bucheon (KR)

( * ) Notice: Subject to any disclaimer, the term of this patent is extended or adjusted under 35 U.S.C. 154(b) by 269 days.

(21) Appl. No.: 13/364,026

(22) Filed: Feb. 1, 2012

(65) Prior Publication Data

US 2012/0200273 A1 Aug. 9, 2012

(30) Foreign Application Priority Data

Feb. 7, 2011 (KR) .................. 10-2011-0010698

(51) Int. Cl.
*H02M 1/38* (2007.01)
(52) U.S. Cl.
USPC .................. 363/131; 363/56.04; 323/235

(58) Field of Classification Search
CPC ......... H02M 1/083; H02M 1/38; H02M 1/08; H02M 2001/0006; H02M 2001/38
USPC ............. 363/56.04, 131, 21.03; 323/235, 319
See application file for complete search history.

(56) References Cited

U.S. PATENT DOCUMENTS

| 7,323,825 B2 | 1/2008 | Hwang et al. |
| 2005/0184714 A1* | 8/2005 | Rusu et al. ............... 323/282 |
| 2011/0298436 A1* | 12/2011 | Tang et al. ............... 323/282 |

* cited by examiner

*Primary Examiner* — Harry Behm
(74) *Attorney, Agent, or Firm* — Okamoto & Benedicto LLP (57) ABSTRACT

The present invention relates to a switch controller and a converter including the same. The switch controller generates an oscillating voltage determining a switching frequency alternately switching a high-side switch and a low-side switch, senses a power source voltage supplied to the switch controller, and maintains the high-side switch and the low-side switch in the turn-off state in a case that the change of the power source voltage is not generated after one of the high-side switch and the low-side switch is turned off according to the oscillating voltage.

21 Claims, 6 Drawing Sheets

SWITCH CONTROLLER AND CONVERTER INCLUDING THE SAME

CROSS-REFERENCE TO RELATED APPLICATION

This application claims priority to and the benefit of Korean Patent Application No. 10-2011-0010698 filed in the Korean Intellectual Property Office on Feb. 7, 2011, the entire contents of which are incorporated herein by reference.

BACKGROUND (a) Field

Embodiments of the present invention relate a switch controller and a converter.

(b) Description of the Related Art

An input voltage of a converter is converted into an output voltage through a power conversion means such as a transformer. A high-side switch and a low-side switch are connected to a primary side of the transformer, thereby controlling power supplied to the primary side. Thus, the power transmitted to a secondary side of the transformer is controlled and the output voltage is controlled. That is, the output voltage of the converter is controlled by each switching operation of the high-side switch and the low-side switch.

A current flowing to the primary side is generated according to resonance between an inductor of the transformer and a blocking capacitor blocking a DC component into the primary side of the transformer. The high-side switch and the low-side switch process zero voltage switching or zero current switching according to a phase of the current of the primary side.

When each switching operation of the high-side switch and the low-side switch fails the zero voltage switching and is zero current switching, hard switching occurs. Also, a shoot-through current may be generated by a reverse recovery. The high-side switch and the low-side switch are turned on by the reverse recovery such that the shoot-through current is a current flowing through two switches.

When hard switching and the shoot-through current are generated by the failure of the zero voltage switching, a quick current increase and noise are generated. The quick current increase causes damage to elements of the converter such as a metal-oxide semiconductor field-effect transistor (MOSFET).

The above information disclosed in this Background section is only for enhancement of understanding of the background of the invention and therefore it may contain information that does not form the prior art that is already known in this country to a person of ordinary skill in the art.

SUMMARY

Embodiments of the present invention provide a switch controller that prevents damage to a converter that is caused by a failure of zero voltage switching, and a converter including the same.

A switch controller controlling a switching operation of a high-side switch and a low-side switch controlling an operation of a converter converting an input voltage to generate an output voltage according to an embodiment includes: an oscillator generating an oscillating voltage determining a switching frequency of alternately switching-operating the high-side switch and the low-side switch; and a zero current prediction unit sensing a power source voltage supplied to the switch controller and maintaining the high-side switch and the low-side switch in a turn-off state in a case that a change of the power source voltage is not generated after one of the high-side switch and the low-side switch is turned off according to the oscillating voltage.

The zero current prediction unit may include: a changing detector detecting the change of the power source voltage and generating a sensing voltage corresponding to the change of the power source voltage; a voltage comparator comparing the sensing voltage and high reference voltage, and the low reference voltage to sense the change of the power source voltage and generating a comparison signal; and a edge detector detecting an edge of the oscillating voltage and generating a pulse signal in synchronization with a time that the edge is generated, wherein the pulse signal and the comparison signal are logic-calculated and it is determined whether the change of the power source voltage is generated after one of the high-side switch and the low-side switch is turned off.

The zero current prediction unit further includes an SR latch including a set terminal input with the pulse signal and a reset terminal input with the comparison signal, and varying and outputting a shoot-down signal according to each edge of the pulse signal and the comparison signal.

The switch controller further includes: a high-side logic calculator logic-calculating an inversion oscillating voltage of which the oscillating voltage is inverted and the shoot-down signal after a dead time period maintaining the high-side switch and the low-side switch in the turn-off state to control the switching operation of the high-side switch; and a low-side logic calculator logic-calculating the oscillating voltage and the shoot-down signal after the dead time period to control the switching operation of the low-side switch.

If the detecting signal is generated such that the shoot-down signal is changed, the output of the high-side logic calculator is determined according to the inversion oscillating voltage and the output of the low-side logic calculator is determined according to the oscillating voltage.

During a period after the pulse signal is generated and before the comparison signal is generated, the output of the high-side logic calculator and the output of the low-side logic calculator respectively maintain the high-side switch and the low-side switch in the off state by the shoot-down signal.

The zero current prediction unit further includes: an SR latch including a set terminal input with the pulse signal and a reset terminal input with the comparison signal, and varying and outputting a shoot-down signal according to each edge of the pulse signal and the comparison signal; and a shoot-down logic unit logic-calculating a logic sum of a high-side logic signal and a low-side logic signal controlling each switching operation of the high-side switch and the low-side switch and the shoot-down control signal to generate the shoot-down signal.

The switch controller further includes: a high-side dead timer changing the high-side logic signal at the time that is delayed by the dead time maintaining the high-side switch and the low-side switch in the turn-off state from the time of the first edge by reacting to the first edge of an inversion oscillating voltage of which the oscillating voltage is inverted, and changing the high-side logic signal by reacting to the second edge of the inversion oscillating voltage; and a low-side dead timer changing the low-side logic signal at the time that is delayed by the dead time by reacting to the first edge of the oscillating voltage, and changing the low-side logic signal by reacting to the second edge of the oscillating voltage.

The switch controller further includes: a high-side delay unit delaying the high-side logic signal by a predetermined logic delay to generate a first gate control signal controlling the operation of the high-side switch; a low-side delay unit delaying the low-side logic signal by the logic delay to generate a second gate control signal controlling the operation of the low-side switch; a high-side gate driver generating a gate signal switching the high-side switch according to the first gate control signal; a low-side gate driver generating the gate signal switching the low-side switch according to the second gate control signal; a first shoot-down switch operated according to the shoot-down signal and connected between the high-side delay unit and the high-side gate driver; and a second shoot-down switch operated according to the shoot-down signal and connected between the low-side delay unit and the low-side gate driver.

If the detecting signal is generated such that the shoot-down control signal is changed, the output of the high-side logic calculator is determined according to the inversion oscillating voltage, and the output of the low-side logic calculator is determined according to the oscillating voltage.

The first shoot-down switch and the second shoot-down switch are maintained in the turn-off state by the shoot-down signal during the period except for the dead time among the period before the pulse signal is generated and the comparison signal is generated.

The changing detector includes: a capacitor including one terminal input with the power source voltage; and a resistor connected between the other terminal of the capacitor and a ground terminal, and the sensing voltage is a voltage of a node to which the other terminal of the capacitor and resistor are connected.

The voltage comparator includes: a first comparator including a non-inversion terminal input with the sensing voltage and an inversion terminal input with the high reference voltage and generating the comparison signal if the sensing voltage is more than the high reference voltage; and a second comparator including an inversion terminal input with the sensing voltage and a non-inversion terminal input with the low reference voltage and generating the comparison signal if the sensing voltage is less than the low reference voltage.

A converter according another embodiment includes: a high-side switch including one terminal transmitted with the input voltage; a low-side switch including one terminal connected to the other terminal of the high-side switch and the other terminal that is grounded; and a switch controller generating the first gate signal switching the high-side switch and the second gate signal switching the low-side switch, wherein the switch controller generates an oscillating voltage determining a switching frequency of alternately switching the high-side switch and the low-side switch, senses a power source voltage supplied to the switch controller, and maintains the high-side switch and the low-side switch in the turn-off state in a case that the change of the power source voltage is not generated after one of the high-side switch and the low-side switch is turned off according to the oscillating voltage.

The switch controller compares the sensing voltage corresponding to the change of the power source voltage with the high reference voltage and the low reference voltage to generate a comparison signal corresponding to the change of the power source voltage, generates the pulse signal in synchronization with the time that the edge of the oscillating voltage is generated, and logic-calculates the pulse signal and the comparison signal to determine whether the change of the power source voltage is generated after one of the high-side switch and the low-side switch is turned off.

If the detecting signal is generated, the first gate signal is determined according to an inversion oscillating voltage of which the oscillating voltage is inverted and the second gate signal is determined according to the oscillating voltage.

During the period after the pulse signal is generated before the comparison signal is generated, the first gate signal and the second gate signal turn off the high-side switch and the low-side switch.

The switch controller generates a high-side logic signal that is changed at the time that is delayed by the dead time maintaining the high-side switch and the low-side switch in the turn-off state from the time of the first edge by reacting to the first edge of an inversion oscillating voltage of which the oscillating voltage is inverted, and is changed by reacting to the second edge of the inversion oscillating voltage, a low-side logic signal that is changed at the time that is delayed by the dead time by reacting to the first edge of the oscillating voltage, and is changed by reacting to the second edge of the oscillating voltage.

The switch controller delays the high-side logic signal by a predetermined logic delay to generate the first gate control signal, and the low-side logic signal by the logic delay to generate the second gate control signal, and the switch controller includes: a high-side gate driver generating the first gate signal according to the first gate control signal; a low-side gate driver generating the second gate signal according to the second gate control signal; a first shoot-down switch transmitting the first gate control signal to the high-side gate driver; and a second shoot-down switch transmitting the second gate control signal to the low-side gate driver.

The switch controller turns on the first shoot-down switch and the second shoot-down switch if the change of the power source voltage is generated.

The switch controller turns-off the first shoot-down switch and the second shoot-down switch during the period except for the dead time among the period before the change of the power source voltage is generated after the edge of the oscillating voltage is generated.

According to exemplary embodiments of the present invention, the failure of the zero voltage switching is predicted to prevent the switching operation before the generation of the shoot-through current and the hard switching, and thereby the damage to the converter by the shoot-through may be prevented.

DETAILED DESCRIPTION OF THE EMBODIMENTS

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout this specification and the claims that follow, when it is described that an element is "coupled" to another element, the element may be "directly coupled" to the other element or "electrically coupled" to the other element through a third element. In addition, unless explicitly described to the contrary, the word "comprise" and variations such as "comprises" or "comprising" will be understood to imply the inclusion of stated elements but not the exclusion of any other elements.

In the following detailed description, only certain exemplary embodiments of the present invention have been shown and described, simply by way of illustration.

Figure 1:
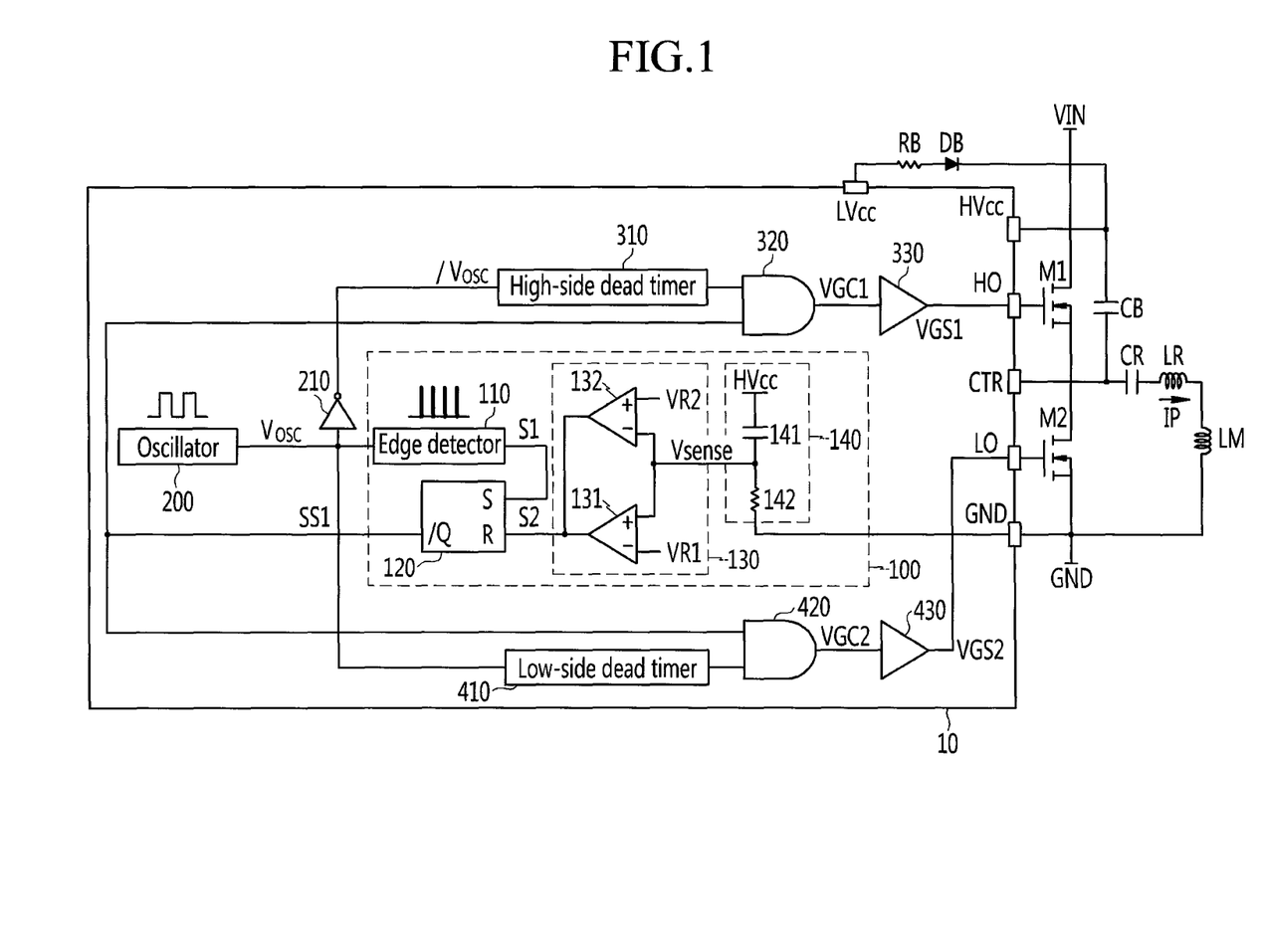
FIG. 1 is a view of a converter according to an exemplary embodiment of the present invention.

FIG. 1 is a view of a converter according to an exemplary embodiment of the present invention.

FIG. 1 is a simple equivalent view of a primary side of a converter 1. A transformer (not shown) of the converter 1, a rectifying circuit (not shown) of an output terminal, and a feedback loop (not shown) are omitted in FIG. 1.

An oscillator 200 of a switch controller 10 generates an oscillating voltage Vosc controlling a switching operation of a high-side switch and a low-side switch by using a feedback signal corresponding to an output voltage of the converter 1. If the output voltage is decreased, the oscillator 200 increases the frequency of the oscillating voltage Vosc to increase the switching frequency of the high-side switch M1 and the low-side switch M2, and if the output voltage is increased, it decreases the frequency of the oscillating voltage Vosc to decrease the switching frequency of the high-side switch M1 and the low-side switch M2.

The switch controller 10 transmits the voltage input to the LVcc terminal to a boost capacitor CB through a boost resistor RB and a boost diode DB to generate a power source voltage HVcc. The boost capacitor CB is connected between an HVcc terminal and a CTR terminal. The power source voltage HVcc is supplied to the switch controller 10 through the HVcc terminal of the switch controller 10. The power source voltage HVcc is a voltage required for the operation of the switch controller 10.

At the primary side of the converter 1, a resonance capacitor CR, a magnetization inductor LM of the transformer, and a resonance inductor LR are formed. The resonance inductor LR may include a leakage inductor (not shown) of the transformer. The resonance capacitor CR, the magnetization inductor LM, and the resonance inductor LR are coupled in series between the CTR terminal and the ground GND terminal.

The high-side switch M1 and the low-side switch M2 are formed with an n-channel transistor. The high-side switch M1 includes a drain electrode input with an input voltage VIN, a gate electrode input with a gate signal VGS1, and a source electrode connected to the CTR terminal. The low-side switch M2 includes a drain electrode connected to the CTR terminal, the gate electrode input with the gate signal VGS2, and the source terminal connected to the ground GND.

Power is stored at the primary side by the input voltage VIN during a period in which the high-side switch M1 is turned on. That is, the power is stored in the magnetization inductor LM, the resonance inductor LR, and the resonance capacitor CR by the current IP of the primary side flowing through the magnetization inductor LM, the resonance inductor LR, and the resonance capacitor CR.

During the period in which the low-side switch M2 is turned on, the power stored to the primary side is transmitted to the secondary side. During a dead period in which the high-side switch M1 and the low-side switch M2 are both turned off, the resonance between the magnetization inductor LM, the resonance inductor LR, and the resonance capacitor CR is generated.

The switch controller 10 includes a zero current prediction unit 100, an oscillator 200, an inverter 210, a high-side dead timer 310, a high-side logic calculator 320, a high-side gate driver 330, a low-side dead timer 410, a low-side logic calculator 420, and a low-side gate driver 430.

The zero current prediction unit 100 senses a power source voltage HVcc and a time that the power source voltage HVcc is changed to predict zero current switching. In the case of the zero voltage switching, the low-side switch M2 is turned on after the time when the power source voltage HVcc starts to decrease. In contrast, the high-side switch M1 is turned on after the time that the power source voltage HVcc starts to increase.

In the case of the zero voltage switching, from the time that the high-side switch M1 is turned off, the voltage of the CTR terminal (hereinafter referred to as a center voltage) is decreased. The voltage of the HVcc terminal coupled to the CTR terminal through the boost capacitor BC, that is, the power source voltage HVcc, is also decreased. Accordingly, for the zero voltage switching of the low-side switch M2, the low-side switch M2 is turned on at the time that the power source voltage starts to decrease.

Also, in the case of the zero voltage switching, from the time that the low-side switch M2 is turned off, the center voltage is increased and the power source voltage is also increased. Accordingly, for the zero voltage switching of the high-side switch M1, the high-side switch M1 must be turned on after the time that the power source voltage starts to increase.

If zero voltage switching is not occurring, zero current switching is generated, and thereby the zero current prediction unit 100 senses the time of the change of the power source voltage HVcc such that the high-side switch M1 and the low-side switch M2 maintain the turn-off state in the case that the change of the power source voltage HVcc is not generated after the turn-off of one of the high-side switch M1 and the low-side switch M2.

The zero current prediction unit 100 includes an edge detector 110, an SR latch 120, a voltage comparator 130, and a changing detector 140.

The edge detector 110 detects the edge of the oscillating voltage Vosc, and generates a pulse signal S1 that is synchronized to the time that the edge is generated.

The SR latch 120 includes a set terminal S input with the pulse signal S1, a reset terminal R input with a comparison signal S2, and an inversion output terminal /Q outputting a shoot-down signal SS1. The SR latch 120 is synchronized with the increasing edge of the pulse signal S1 to generate a shoot-down signal SS1 of a high level, and is synchronized with the increasing edge of the comparison signal S2 to generate a shoot-down signal SS1 of a low level.

The changing detector 140 detects the change of the power source voltage HVcc. The changing detector 140 generates the sensing voltage Vsense corresponding to the change of the power source voltage HVcc. The changing detector 140 may be realized as a differential circuit, and generates a sensing voltage Vsense of a level that is changed according to the change of the power source voltage HVcc. The changing detector 140 includes a capacitor 141 and a resistor 142. The capacitor 141 and the resistor 142 are connected in series between the power source voltage HVcc and the GND terminal.

If the power source voltage HVcc is constantly maintained, the current does not flow to the capacitor 141 and the resistor 142. Accordingly, the sensing voltage Vsense is maintained as a voltage of 0 of the GND terminal.

If the power source voltage HVcc starts to decrease, the current flows from the GND terminal to the resistor 142 and the capacitor 141 such that the sensing voltage Vsense is decreased to a voltage that is less than the voltage of the GND terminal. Here, the low voltage is determined according to the change degree of the power source voltage HVcc, that is, a decreasing slope. The sensing voltage Vsense is maintained as the low voltage during the period in which the power source voltage HVcc is decreased. Also, if the power source voltage HVcc is maintained as the decreased voltage, the sensing voltage Vsense is again maintained as a voltage of 0.

If the power source voltage HVcc starts to increase, the current flows from the capacitor 141 and the resistor 142 to the ground terminal GND such that the sensing voltage Vsense is increased to a voltage that is higher than the voltage of the ground terminal GND. Here, the high voltage is determined according to the change degree of the power source voltage HVcc, that is, the increasing slope. The sensing voltage Vsense is maintained as the high voltage during the period in which the power source voltage HVcc is increased. Also, if the power source voltage HVcc is maintained as the increased voltage, the sensing voltage Vsense is again maintained as a voltage of 0.

The voltage comparator 130 compares the sensing voltage Vsense with the high reference voltage VR1 and the low reference voltage VR2 to sense the change of the power source voltage HVcc and to generate the comparison signal S2. The voltage comparator 130 includes a high-side comparator 131 and a low-side comparator 132.

The high-side comparator 131 includes an inversion terminal (−) input with the high reference voltage VR1 and a non-inversion terminal (+) input with the sensing voltage Vsense. The low-side comparator 132 includes a non-inversion terminal (+) input with the low reference voltage VR2 and an inversion terminal (−) input with the sensing voltage Vsense.

The high-side comparator 131 and the low-side comparator 132 output the high level if the input of the non-inversion terminal (+) is more than the input of the inversion terminal (−), if or not, they output the low level.

Accordingly, if the sensing voltage Vsense is greater than the high reference voltage VR1, the high-side comparator 131 outputs the comparison signal S2 of the high level, and if the sensing voltage Vsense is greater than the low reference voltage VR2, the low-side comparator 132 outputs the comparison signal S2 of the high level. If the comparison signal S2 becomes the high level, the SR latch 120 generates and outputs the shoot-down signal SS1 of the high level.

The high reference voltage VR1 according to an exemplary embodiment of the present invention may be set up as the voltage that is less than the sensing voltage Vsense that is determined as a voltage that is larger than the voltage of 0 according to the increase of the power source voltage HVcc. Also, the low reference voltage VR2 may be set up as a voltage that is higher than the sensing voltage Vsense that is determined as the voltage that is lower than the voltage of 0 according to the decrease of the power source voltage HVcc.

The inverter 210 inverts the oscillating voltage Vosc to generate the inversion oscillating voltage /Vosc.

The high-side dead timer 310 receives the inversion oscillating voltage /Vosc, and if the increasing edge of the inversion oscillating voltage /Vosc is sensed, it delays the inversion oscillating voltage /Vosc by a predetermined dead time and outputs it. When it is not the increasing edge of the inversion oscillating voltage /Vosc, the high-side dead timer 310 outputs the inversion oscillating voltage /Vosc without a delay.

The high-side logic calculator 320 logic-calculates the output signal of the high-side dead timer 310 and the shoot-down signal SS1 to generate the high-side gate control signal VGC1. The high-side logic calculator 320 according to an exemplary embodiment of the present invention is realized as an AND gate, and executes a logic multiplication calculation.

The high-side gate driver 330 generates the high-side gate signal VGS1 controlling the switching operation of the high-side switch M1 according to the high-side gate control signal VGC1. The high-side switch M1 is an n-channel type, and if the high-side gate signal VGS1 is the high level, the high-side switch M1 is turned on, while if the high-side gate signal VGS1 is the low level, the high-side switch M1 is turned off. The high-side gate driver 330 generates the high-side gate signal VGS1 of the high level according to the high-side gate control signal VGC1 of the high level and generates the high-side gate signal VGS1 of the low level according to the high-side gate control signal VGC1 of the low level.

The low-side dead timer 410 receives the oscillating voltage and Vosc, if the increasing edge of the oscillating voltage Vosc is sensed, it delays the oscillating voltage Vosc by a predetermined dead time and outputs it. When the oscillating voltage Vosc is not increasing, the low-side dead timer 410 outputs the oscillating voltage Vosc without a delay.

The low-side logic calculator 420 logic-calculates the output signal of the low-side dead timer 410 and the shoot-down signal SS1 to generate the low-side gate control signal VGC2. The low-side logic calculator 420 according to an exemplary embodiment of the present invention is realized as an AND gate and executes the logic multiplication calculation.

The low-side gate driver 430 generates the low-side gate signal VGS2 controlling the switching operation of the low-side switch M2 according to the low-side gate control signal VGC2. The low-side switch M2 is an n-channel type, and if the low-side gate signal VGS2 is the high level, the low-side switch M2 is turned on, while if the low-side gate signal VGS2 is the low level, the low-side switch M2 is turned off. The low-side gate driver 430 generates the low-side gate signal VGS2 of the high level according to the low-side gate control signal VGC2 of the high level, and generates the low-side gate signal VGS2 of the low level according to the low-side gate control signal VGC2 of the low level.

Next, an operation of the switch controller 10 according to an exemplary embodiment of the present invention will be described with reference to FIG. 2 and FIG. 3.

Figure 2:
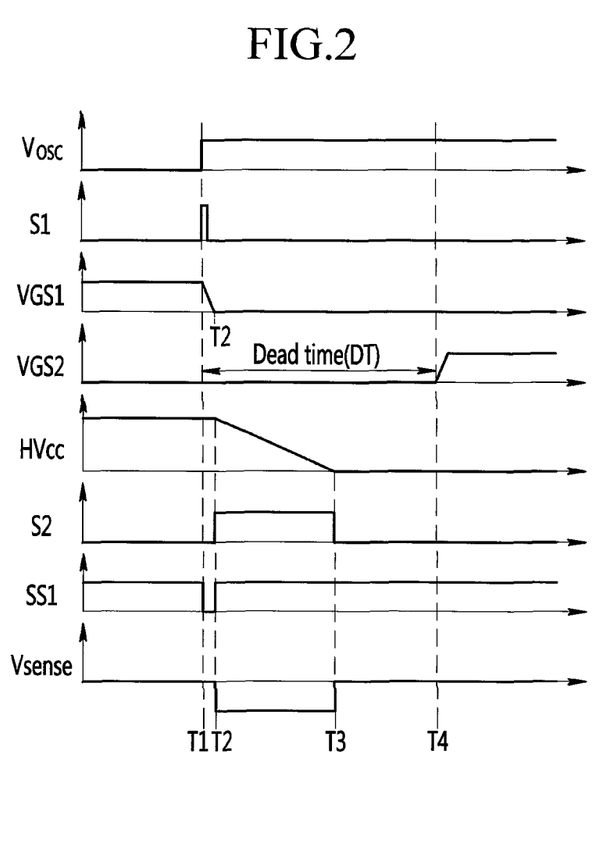
FIG. 2 is a view of a waveform of switch controller signals in a case of zero voltage switching.

FIG. 2 is a view of a waveform of switch controller signals in a case of zero voltage switching.

As shown in FIG. 2, if the oscillating voltage Vosc is increased at the time T1, the edge detector 110 detects the edge of the oscillating voltage Vosc to generate the pulse signal S1. The SR latch 120 generates the shoot-down signal SS1 of the low level by the increasing edge of the pulse signal S1. The inversion oscillating voltage Vosc becomes the low level at the time T1 such that the gate control signal VGC1 becomes the low level. The high-side gate driver 330 generates the gate signal VGS1 of the low level at the time T1. However, a predetermined period is needed for the gate signal VGS1 to decrease from the high level to the low level. The gate signal VGS1 starts to decrease from the time T1 and becomes the voltage of 0 at the time T2. The high-side switch M1 is turned off at the period T2, and if the high-side switch M1 is turned off, the power source voltage HVcc starts to decrease at the time T2.

If the power source voltage HVcc starts to decrease at the time T2, the sensing voltage Vsense becomes the low level. The sensing voltage Vsense is maintained as the low level during the period T2-T3 in which the power source voltage HVcc is decreased. If the sensing voltage Vsense becomes the low level at the time T2 such that it is lower than the low reference voltage VR2, the comparison signal S2 becomes the high level such that the SR latch 120 generates and outputs the shoot-down signal SS1 of the high level at the time T2.

The low-side dead timer 410 sensing the increasing edge of the oscillating voltage Vosc at the time T1 transmits the oscillator voltage Vosc to the low-side logic calculator 420 at the time T4 after the dead time DT shown in FIG. 2. The input signals of the low-side logic calculator 420 are the high level at the time T4 such that the low-side logic calculator 420 outputs the gate control signal VGC2 of the high level to the low-side gate driver 430. The low-side gate driver 430 generates the gate signal VGS2 of the high level at the time T4.

As described above, in the zero voltage switching, the decreasing of the power source voltage HVcc is generated before the time of the turn on of the low-side switch M2, and thereby the low-side switch M2 may be turned on at the time T4. If the decrease of the power source voltage HVcc is not generated such that the shoot-down signal SS1 is maintained as the low level, the output of the low-side logic calculator 420 is the low level at the time T4 such that the gate signal VGS2 is not increased.

In FIG. 2, it is explained that the high-side switch M1 is turned off and the low-side switch M2 is turned on, however a case in which the low-side switch M2 is turned off and the high-side switch M1 is turned on is the same. That is, in the zero voltage switching, the low-side switch M2 is turned off, and the time that the power source voltage HVcc starts to be increased is earlier than the time of the turn-on of the high-side switch M1.

Next, the operation of the switch controller 10 blocking the zero current switching will be described with reference to FIG. 3 in a case of the zero voltage switching.

Figure 3:
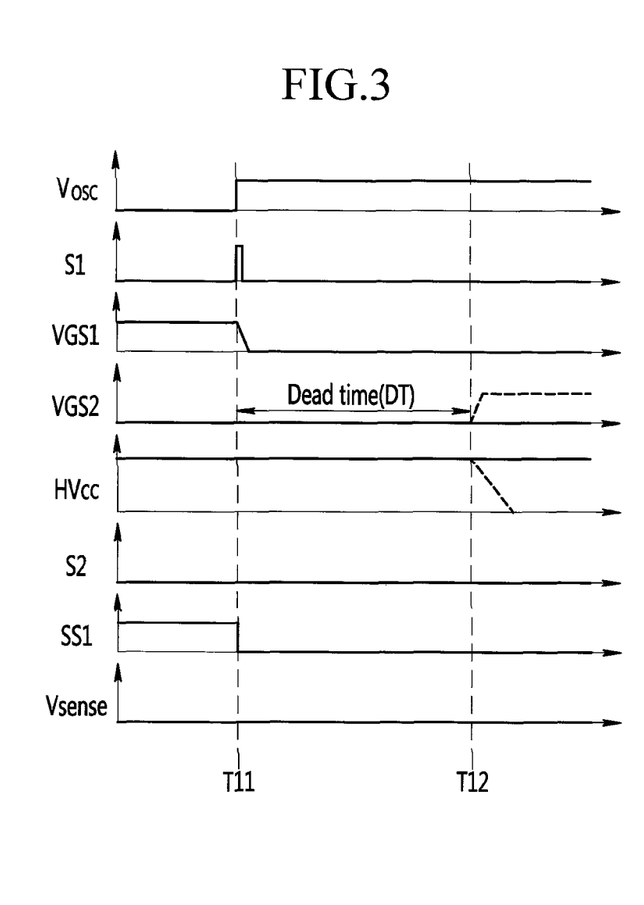
FIG. 3 is a view showing signals of a switch controller according to an exemplary embodiment of the present invention when zero voltage switching has failed.

FIG. 3 is a view showing signals of a switch controller according to an exemplary embodiment of the present invention when zero voltage switching has failed.

As shown in FIG. 3, the pulse signal S1 is generated at the time T11 when the oscillating voltage Vosc is increased such that the SR latch 120 outputs the shoot-down signal SS1 of the low level. After the time T11, the power source voltage HVcc is not decreased and is constantly maintained.

Thus, the sensing voltage Vsense is not decreased to the low level such that the comparison signal S2 is maintained as the low level and the shoot-down signal SS1 is maintained as the low level after the time T11. The high-side logic calculator 320 and the low-side logic calculator 420 both generate the gate control signals VGC1 and VGC2 of the low level by the shoot-down signal SS1 of the low level. Accordingly, the high-side gate driver 330 and the low-side gate driver 430 generate the gate signals VGS1 and VGS2 of the low level.

Thus, the high-side switch M1 and the low-side switch M2 are both turned off such that the switching the operation is not generated. Accordingly, the generation of the zero current switching may be blocked.

If, in a case of a conventional art in which the shoot-down signal SS1 exists, as shown in the dotted line FIG. 3, the low-side gate driver 430 increases the gate signal VGS2 at the time T12, the low-side switch M2 is turned on and the power source voltage HVcc starts to decrease. That is, hard switching of the low-side switch M2 is generated at the time T12. In the present invention, the low-side switch M2 is not turned on by the shoot-down signal SS1 such that the zero current switching is not generated.

Figure 4:
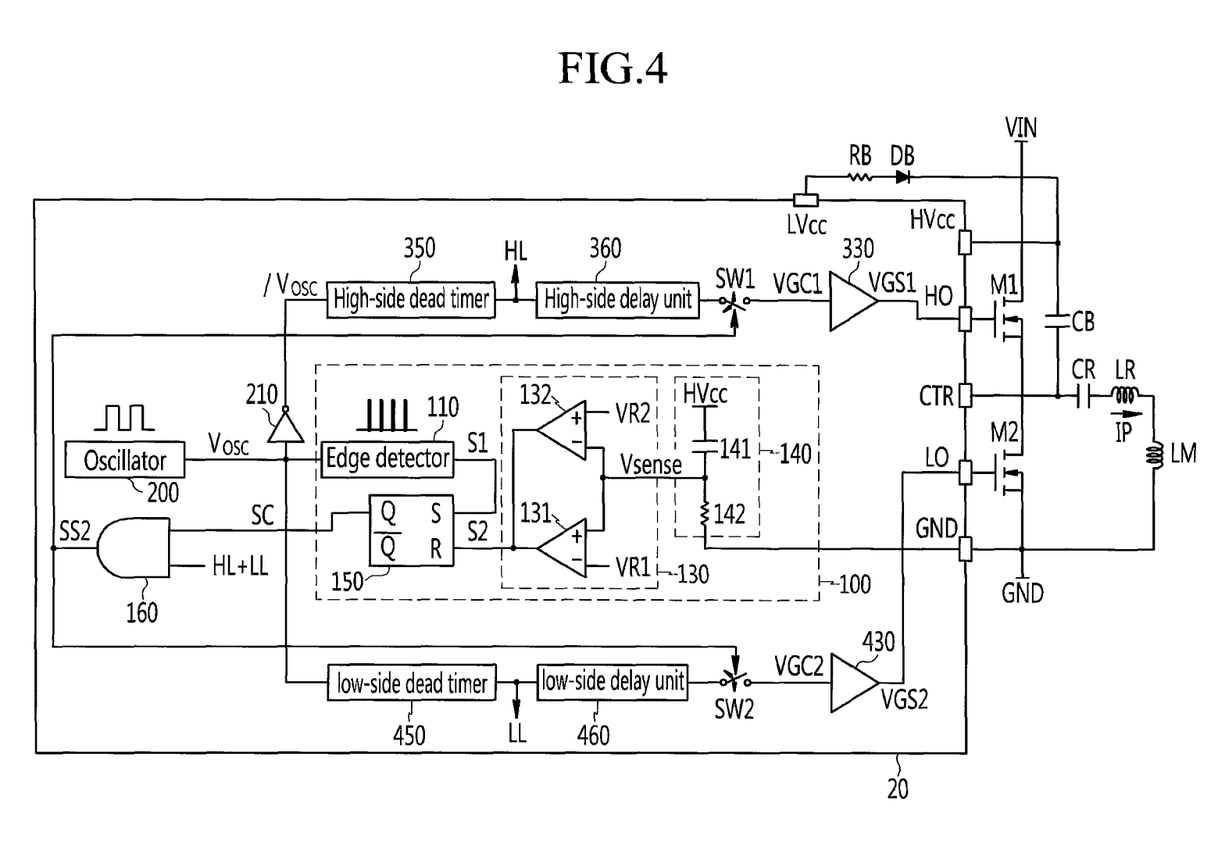
FIG. 4 is a view of a switch controller according to another exemplary embodiment of the present invention.

FIG. 4 is a view of a switch controller according to another exemplary embodiment of the present invention. Compared with the exemplary embodiment of the present invention shown in the FIG. 1, the switch controller 20 further include a high-side delay unit 360 and a low-side delay unit 460.

An SR latch 150 outputs a shoot-down control signal SC through the output terminal Q. Accordingly, the shoot-down control signal SC becomes the high level in synchronization with the increasing edge of the input signal of the set terminal S and becomes the low level in synchronization with the increasing edge of the input signal of the reset terminal R. Also, the zero current prediction unit 500 further includes a shoot-down logic unit 160 receiving a shoot-down control signal SC as one input.

If the inversion oscillating voltage /Vosc is increased, a high-side dead timer 350 generates the high-side logic signal HL of the high level having a logic value of 1 at the time that is delayed by the dead time DT from the increasing time, and if the inversion oscillating voltage /Vosc is decreased, the high-side dead timer 350 generates the high-side logic signal HL of the low level having a logic value of 0 at the decreasing time.

If the oscillating voltage Vosc is increased, the low-side dead timer 450 generates the low-side logic signal LL of the high level having the logic value of 1 at the time that is delayed by the dead time DT from the increasing time, and if the oscillating voltage Vosc is decreased, the low-side dead timer 450 generates the low-side logic signal LL of the low level having the logic value of 0 at the decreasing time.

The high-side delay unit 360 delays the high-side logic signal HL by a predetermined logic delay and outputs it as the gate control signal VGC1. The low-side delay unit 460 delays the low-side logic signal LL by a predetermined logic delay and outputs it as the gate control signal VGC2. Accordingly, the gate control signal VGC1 and the gate control signal VGC2 are logic signals having the high level or the low level.

The high-side switch M1 is in an on state during the period of the high level that the gate control signal VGC1 represents the logic value of 1, and the high-side switch M1 is in an off state during the period of the low level when the gate control signal VGC1 represents the logic value of 0. The low-side switch M2 is in the on state during the period of the high level in which the gate control signal VGC2 represents the logic value of 1, and the low-side switch M2 is in the off state during the period of the low level in which the gate control signal VGC2 represents the logic value of 0.

The shoot-down switch SW1 is connected between the high-side delay unit 360 and the high-side gate driver 330, and the shoot-down switch SW2 is connected between the low-side delay unit 460 and the low-side gate driver 430. The shoot-down switch SW1 and the shoot-down switch SW2 are switching-operated by the shoot-down signal SS2.

In another exemplary embodiment of the present invention, it is set up that the shoot-down switch SW1 and the shoot-down switch SW2 are turned on by the shoot-down signal SS2 of the low level, and the shoot-down switch SW1 and the shoot-down switch SW2 are turned off by the shoot-down signal SS2 of the high level.

The shoot-down logic unit 160 logic-calculates the logic sun HL+LL of the high-side logic signal HL and the low-side logic signal LL and the shoot-down control signal SC to generate the shoot-down signal SS2. The shoot-down logic unit 160 according to an exemplary embodiment of the present invention is realized as an AND gate. Accordingly, when the shoot-down control signal SC and the logic sum HL+LL are both the high level, the shoot-down signal SS2 becomes the high level such that the shoot-down switches SW1 and SW2 are turned off.

Next, referring to FIG. 5, the operation of the switch controller 20 will be described in the case of zero voltage switching, and referring to FIG. 6, the operation of the switch controller 20 will be described in the case of the failure of zero voltage switching.

Figure 5:
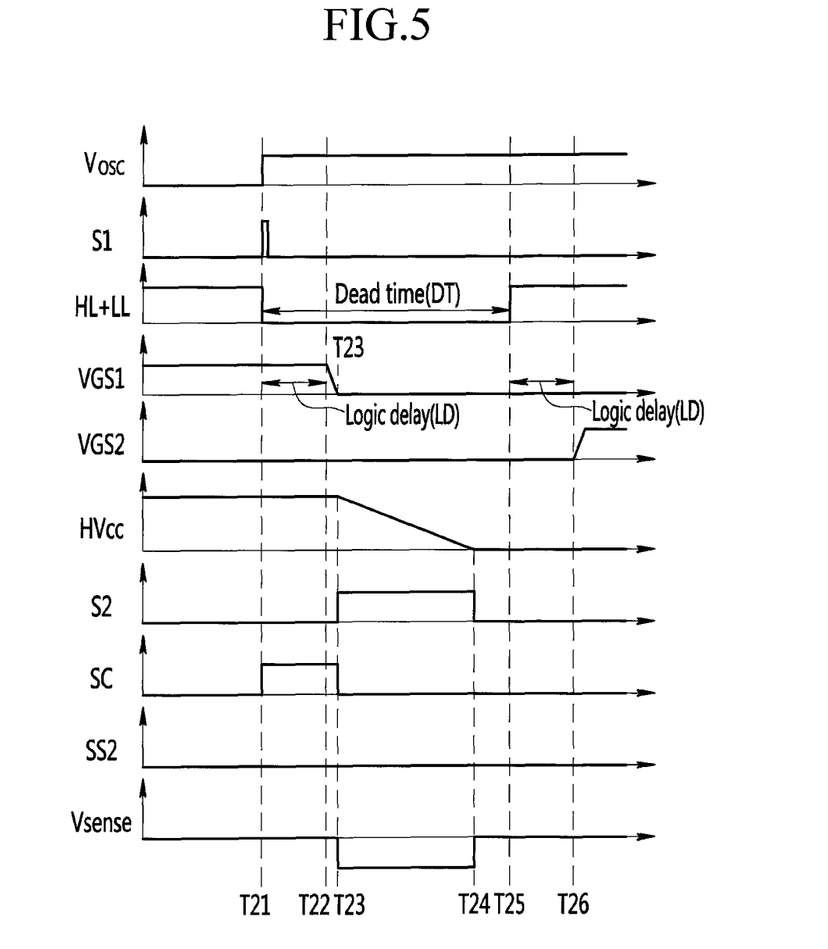
FIG. 5 is a view showing signals generated in a switch controller 20 according to another exemplary embodiment of the present invention in a case of zero voltage switching.

FIG. 5 is a view showing signals generated in a switch controller 20 according to another exemplary embodiment of the present invention in a case of zero voltage switching.

As shown in FIG. 5, the oscillating voltage Vosc is increased at the time T21, and the edge detector 110 detects the edge of the oscillating voltage Vosc to generate the pulse signal S1. The SR latch 120 generates the shoot-down control signal SC of the high level at the increasing edge of the pulse signal S1. The inversion oscillating voltage Vosc becomes the low level at the time T21 such that the high-side logic signal HL becomes the low level. The low-side logic signal LL is the low level such that the logic sum HL+LL becomes the low level at the time T21.

The high-side logic signal HL is transmitted as the gate control signal VGC1 to the high-side gate driver 330 at the time T22 that is delayed by the logic delay LD in the high-side delay unit 360. The high-side gate driver 330 generates the gate signal VGS1 of the low level at the time T22. However, a predetermined period is needed for the gate signal VGS1 to decrease from the high level to the low level. The gate signal VGS1 starts to decrease from the to time T22 and becomes the voltage of 0 at the time T23. If the high-side switch M1 is turned off at the time T23 and the high-side switch M1 is turned off, the power source voltage HVcc starts to decrease from the time T23.

If the power source voltage HVcc starts to decrease at the time T23, the sensing voltage Vsense becomes the low level. The sensing voltage Vsense is maintained as the low level during the period T23-T24 in which the power source voltage HVcc is decreased. If the sensing voltage Vsense becomes the low level at the time T23 such that it is less than the low reference voltage VR2, the comparison signal S2 becomes the high level such that the SR latch 150 generates and outputs the shoot-down control signal SC of the low level at the time T23.

The low-side dead timer 410 senses the increasing edge of the oscillating voltage Vosc at the time T21 and transmits the low-side logic signal LL of the high level to the low-side delay unit 460 at the time T25 after the dead time DT shown in FIG. 5. The logic sum HL+LL becomes the high level at the time T25.

The low-side delay unit 460 outputs the gate control signal VGC2 at the time T26 in which the low-side logic signal LL of the high level is delayed by the logic delay LD. The shoot-down signal SS2 is maintained as the low level and the shoot-down switch SW2 is in the turn-on state such that the gate control signal VGC2 is transmitted to the low-side gate driver 460.

The low-side gate driver 430 generates the gate signal VGS2 of the high level at the time T26.

In FIG. 5, the case in which the high-side switch M1 is turned off and the low-side switch M2 is turned on is described, however a case in which the low-side switch M2 is turned off and the high-side switch M1 is turned on is the same. That is, in the zero voltage switching, the time that the low-side switch M2 is turned off and the power source voltage HVcc starts to increase is earlier than the time of the turn-on of the high-side switch M1.

Next, referring to FIG. 6, the operation of the switch controller 20 blocking the zero current switching will be described in the case of failure of zero voltage switching.

Figure 6:
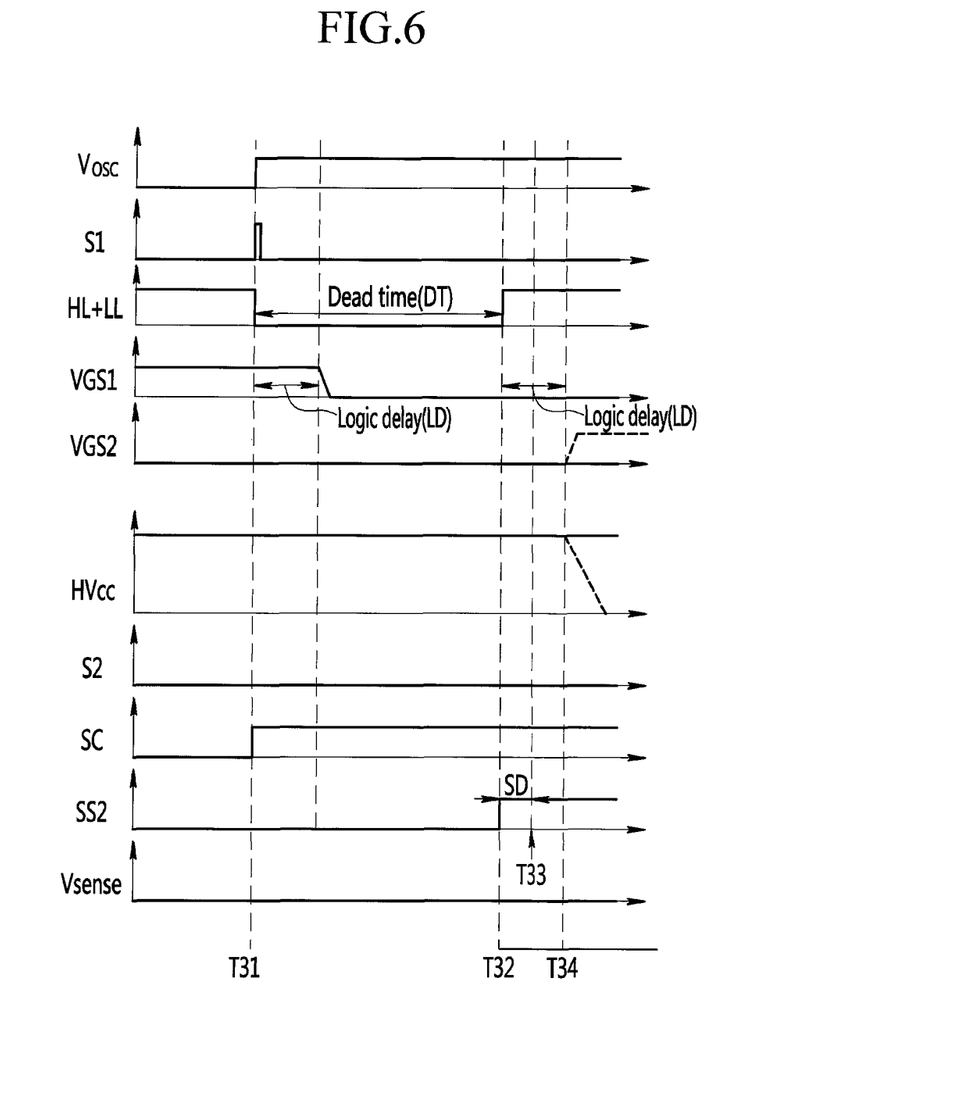
FIG. 6 is a view showing signals of a switch controller according to an exemplary embodiment of the present invention when zero voltage switching has failed.

FIG. 6 is a view showing signals of a switch controller according to an exemplary embodiment of the present invention when zero voltage switching has failed.

As shown in FIG. 6, the pulse signal S1 is generated at the time T31 at which the oscillating voltage Vosc is increased such that the SR latch 150 outputs the shoot-down control signal SC of the high level. After the time T31, the power source voltage HVcc is not decreased and but constantly maintained.

Thus, the sensing voltage Vsense is not decreased to the low level such that the comparison signal S2 is maintained as the low level, and the shoot-down control signal SC is maintained as the high level after the time T31.

If the logic sum HL+LL is increased to the high level at the time T32, the shoot-down logic unit 160 generates the shoot-down signal SS2 of the high level. When the shoot-down delay during which the shoot-down signal SS2 is transmitted to the shoot-down switches SW1 and SW2 is generated, the shoot-down switches SW1 and SW2 are turned off at the time T33.

After the logic delay LD at the time T32, although the low-side delay unit 460 outputs the gate control signal VGC2 of the high level at the time T34, the shoot-down switch SW2 is turned off such that the low-side gate driver 430 maintains the gate signal VGS2 of the low level.

If, in the case of the conventional art in which the shoot-down signal SS2 does not exist, as shown by the dotted line in FIG. 6, the low-side gate driver 430 increases the gate signal VGS2 at the time T34 such that the low-side switch M2 is turned on and the power source voltage HVcc starts to b decrease. That is, the hard switching of the low-side switch M2 is generated at the time T34. In the present invention, the low-side switch M2 is not turned on by the shoot-down signal SS2 such that the zero current switching is not generated.

As described above, the low-side switch M2 is turned on at the time that the power source voltage HVcc starts to decrease, and thereby the zero current switching is not generated.

Also, referring to FIG. 3 and FIG. 6, it is described that the zero current switching of the low-side switch M2 is prevented, however the present invention is not limited thereto. That is, in the case that the zero voltage switching of the high-side switch M1 has failed, the high-side switch M1 is equally turned on.

In detail, in the case that the power source voltage HVcc is not increased, if the sensing voltage Vsense is not increased and is less than the high reference voltage VR1, the comparison signal S2 is maintained as the low level.

Thus, in the previous exemplary embodiment, the shoot-down signal SS1 is maintained as the low level and the high-side logic calculator 320 generates the gate control signal VGC1 of the low level. In another exemplary embodiment, the shoot-down control signal SC is maintained as the high level and the shoot-down signal SS2 becomes the high level at the time that the logic sum HL+LL becomes the high level such that the shoot-down switches SW1 and SW2 are turned off.

As described above, in the case of the failure of the zero voltage switching, the switch controller according to an exemplary embodiments of the present invention predicts the generation of the zero current switching such that the high-side switch M1 and the low-side switch M2 are turned off.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

DESCRIPTION OF SYMBOLS converter 1, switch controller 10 and 20, oscillator 200
resonance capacitor CR, boost resistor BR, boost diode BD boost capacitor BC, magnetization inductor LM, resonance inductor LR
high-side switch M1, low-side switch M2, zero current prediction unit 100
oscillator 200, inverter 210, high-side dead timer 310 and 350
high-side delay unit 360, low-side delay unit 460
shoot-down logic unit 160, high-side logic calculator 320
high-side gate driver 330, low-side dead timer 410 and 450
low-side logic calculator 420, low-side gate driver 430
edge detector 110, SR latch 120 and 150, voltage comparator 130
changing detector 140, capacitor 141, resistor 142
high-side comparator 131, low-side comparator 132

What is claimed is:

1. A switch controller controlling a switching operation of a high-side switch and a low-side switch controlling an operation of a converter converting an input voltage to generate an output voltage, comprising:
an oscillator generating an oscillating voltage determining a switching frequency of alternately switching-operating the high-side switch and the low-side switch; and
a zero current prediction unit sensing a power source voltage supplied to the switch controller and maintaining the high-side switch and the low-side switch in a turn-off state in a case that a change of the power source voltage is not generated after one of the high-side switch and the low-side switch is turned off according to the oscillating voltage.

2. The switch controller of claim 1, wherein the zero current prediction unit includes:
a changing detector detecting the change of the power source voltage and generating a sensing voltage corresponding to the change of the power source voltage;
a voltage comparator comparing the sensing voltage to a high reference voltage and a low reference voltage to sense the change of the power source voltage and generating a comparison signal; and
an edge detector detecting an edge of the oscillating voltage and generating a pulse signal in synchronization with a time that the edge is generated,
wherein the pulse signal and the comparison signal are logic-calculated and it is determined whether the change of the power source voltage is generated after one of the high-side switch and the low-side switch is turned off.

3. The switch controller of claim 2, wherein the zero current prediction unit further includes an SR latch including a set terminal input with the pulse signal and a reset terminal input with the comparison signal, and varying and outputting a shoot-down signal according to each edge of the pulse signal and the comparison signal.

4. The switch controller of claim 3, wherein the switch controller further includes:
a high-side logic calculator logic-calculating an inversion oscillating voltage of which the oscillating voltage is inverted and the shoot-down signal after a dead time period maintaining the high-side switch and the low-side switch in the turn-off state to control the switching operation of the high-side switch; and
a low-side logic calculator logic-calculating the oscillating voltage and the shoot-down signal after the dead time period to control the switching operation of the low-side switch.

5. The switch controller of claim 4, wherein when a detecting signal is generated such that the shoot-down signal is changed, the output of the high-side logic calculator is determined according to the inversion oscillating voltage and the output of the low-side logic calculator is determined according to the oscillating voltage.

6. The switch controller of claim 4, wherein during a period after the pulse signal is generated and before the comparison signal is generated, the output of the high-side logic calculator and the output of the low-side logic calculator respectively maintain the high-side switch and the low-side switch in the off state by the shoot-down signal.

7. The switch controller of claim 2, wherein the zero current prediction unit further includes:
an SR latch including a set terminal input with the pulse signal and a reset terminal input with the comparison signal, and varying and outputting a shoot-down signal according to each edge of the pulse signal and the comparison signal; and
a shoot-down logic unit logic-calculating a logic sum of a high-side logic signal and a low-side logic signal controlling each switching operation of the high-side switch and the low-side switch and the shoot-down control signal to generate the shoot-down signal.

8. The switch controller of claim 7, wherein the switch controller further includes:
a high-side dead timer changing the high-side logic signal at a time that is delayed by the dead time maintaining the high-side switch and the low-side switch in the turn-off state from the time of the first edge by reacting to the first edge of an inversion oscillating voltage of which the oscillating voltage is inverted, and changing the high-side logic signal by reacting to the second edge of the inversion oscillating voltage; and
a low-side dead timer changing the low-side logic signal at the time that is delayed by the dead time by reacting to the first edge of the oscillating voltage, and changing the low-side logic signal by reacting to the second edge of the oscillating voltage.

9. The switch controller of claim 8, wherein the switch controller further includes:
a high-side delay unit delaying the high-side logic signal by a predetermined logic delay to generate a first gate control signal controlling the operation of the high-side switch;
a low-side delay unit delaying the low-side logic signal by the logic delay to generate a second gate control signal controlling the operation of the low-side switch;
a high-side gate driver generating a gate signal switching the high-side switch according to the first gate control signal;
a low-side gate driver generating the gate signal switching the low-side switch according to the second gate control signal;
a first shoot-down switch operated according to the shoot-down signal and connected between the high-side delay unit and the high-side gate driver; and
a second shoot-down switch operated according to the shoot-down signal and connected between the low-side delay unit and the low-side gate driver.

10. The switch controller of claim 9, wherein when a detecting signal is generated such that the shoot-down control signal is changed, the output of the high-side logic calculator is determined according to the inversion oscillating voltage, and the output of the low-side logic calculator is determined according to the oscillating voltage.

11. The switch controller of claim 9, wherein the first shoot-down switch and the second shoot-down switch are maintained in the turn-off state by the shoot-down signal during the period except for the dead time among the period before the pulse signal is generated and the comparison signal is generated.

12. The switch controller of claim 2, wherein the changing detector includes:
 a capacitor including one terminal input with the power source voltage; and
 a resistor connected between the other terminal of the capacitor and a ground terminal, and the sensing voltage is a voltage of a node to which the other terminal of the capacitor and the resistor are connected.

13. The switch controller of claim 2, wherein the voltage comparator includes:
 a first comparator including a non-inversion terminal input with the sensing voltage and an inversion terminal input with the high reference voltage and generating the comparison signal if the sensing voltage is more than the high reference voltage; and
 a second comparator including an inversion terminal input with the sensing voltage and a non-inversion terminal input with the low reference voltage and generating the comparison signal if the sensing voltage is less than the low reference voltage.

14. A converter comprising:
 a high-side switch including a first terminal that receives an input voltage;
 a low-side switch including a first terminal connected to a second terminal of the high-side switch, the low-side switch further including a second terminal that is grounded; and
 a switch controller generating a first gate signal switching the high-side switch and a second gate signal switching the low-side switch,
 wherein the switch controller generates an oscillating voltage determining a switching frequency of alternately switching the high-side switch and the low-side switch, senses a power source voltage supplied to the switch controller, and maintains the high-side switch and the low-side switch in a turn-off state in a case that the change of the power source voltage is not generated after one of the high-side switch and the low-side switch is turned off according to the oscillating voltage.

15. The converter of claim 14, wherein the switch controller compares the sensing voltage corresponding to the change of the power source voltage to a high reference voltage and a low reference voltage to generate a comparison signal corresponding to the change of the power source voltage, generates a pulse signal in synchronization with a time that an edge of the oscillating voltage is generated, and logic-calculates the pulse signal and the comparison signal to determine whether the change of the power source voltage is generated after one of the high-side switch and the low-side switch is turned off.

16. The converter of claim 15, wherein when a detecting signal is generated, the first gate signal is determined according to an inversion oscillating voltage of which the oscillating voltage is inverted and the second gate signal is determined according to the oscillating voltage.

17. The converter of claim 15, wherein during a period after the pulse signal is generated before the comparison signal is generated, the first gate signal and the second gate signal turn off the high-side switch and the low-side switch.

18. The converter of claim 15, wherein the switch controller generates a high-side logic signal that is changed at a time that is delayed by a dead time maintaining the high-side switch and the low-side switch in the turn-off state from the time of the edge of the oscillating voltage by reacting to a first edge of an inversion oscillating voltage of which the oscillating voltage is inverted and is changed by reacting to a second edge of the inversion oscillating voltage, and
 the switch controller generates a low-side logic signal that is changed at the time that is delayed by the dead time by reacting to the first edge of the oscillating voltage and is changed by reacting to the second edge of the oscillating voltage.

19. The converter of claim 18, wherein the switch controller delays the high-side logic signal by a predetermined logic delay to generate a first gate control signal, and delays the low-side logic signal by the predetermined logic delay to generate a second gate control signal, and the switch controller includes:
 a high-side gate driver generating the first gate signal according to the first gate control signal;
 a low-side gate driver generating the second gate signal according to the second gate control signal;
 a first shoot-down switch transmitting the first gate control signal to the high-side gate driver; and
 a second shoot-down switch transmitting the second gate control signal to the low-side gate driver.

20. The converter of claim 19, wherein the switch controller turns on the first shoot-down switch and the second shoot-down switch if the change of the power source voltage is generated.

21. The converter of claim 19, wherein the switch controller turns off the first shoot-down switch and the second shoot-down switch during the period except for the dead time among the period before the change of the power source voltage is generated after the edge of the oscillating voltage is generated.

* * * * *